June 18, 1968 J. J. PHILLIPS 3,388,933
ELECTROMECHANICAL ACTUATOR PACKAGE
Filed Aug. 3, 1966 2 Sheets-Sheet 1
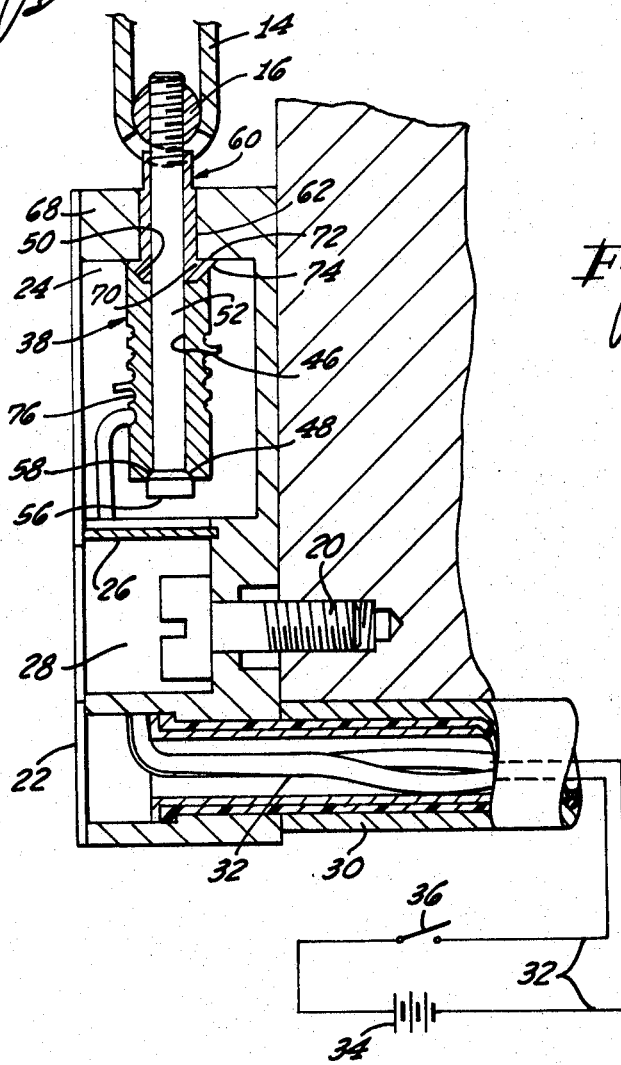
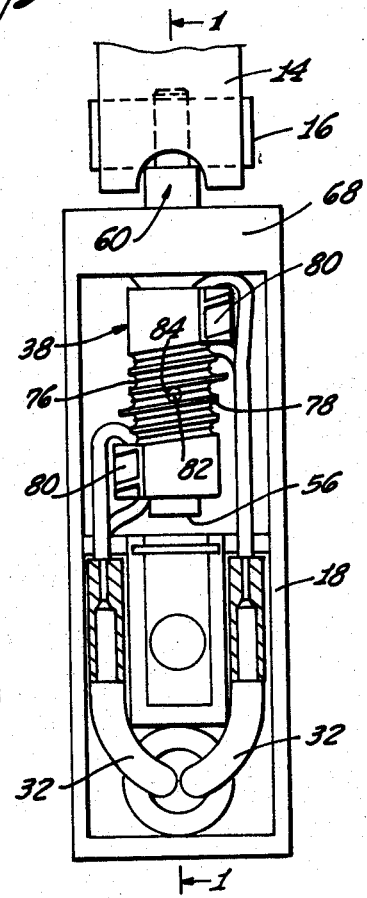
INVENTOR:
John J. Phillips
ATTORNEY June 18, 1968  J. J. PHILLIPS  3,388,933
ELECTROMECHANICAL ACTUATOR PACKAGE
Filed Aug. 3, 1966  2 Sheets-Sheet 2
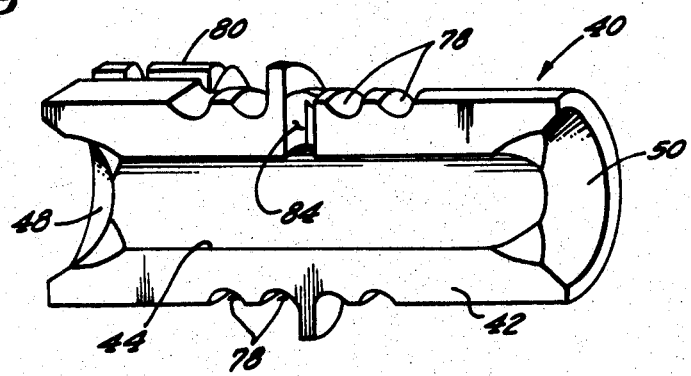
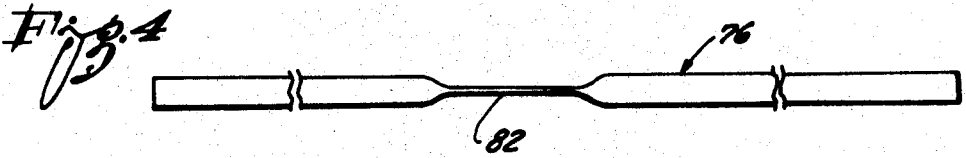
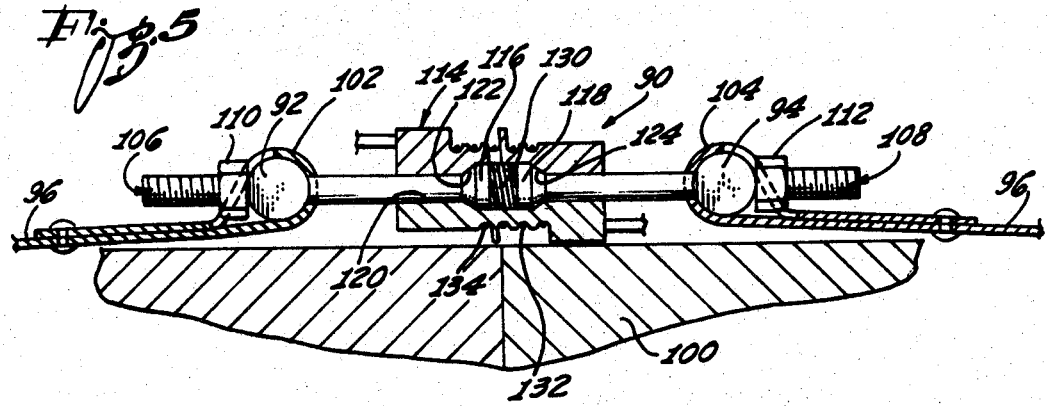
INVENTOR:
John J. Phillips
ATTORNEY United States Patent Office 3,388,933
Patented June 18, 1968

3,388,933
ELECTROMECHANICAL ACTUATOR PACKAGE
John J. Phillips, Los Angeles, Calif., assignor to Gray & Huleguard, Santa Monica, Calif., a corporation of California
Filed Aug. 3, 1966, Ser. No. 569,939
13 Claims. (Cl. 287—1)

The present invention relates to means for releasing a mechanical load and more particularly to small compact electrically energizable means for very rapidly releasing a mechanical load with a minimum amount of electrical energy.

It is frequently desirable to temporarily restrain a heavy mechanical load and then very quickly release it. One means for accomplishing this, particularly when the load is to be automatically and/or remotely released, is to employ some form of hydraulic or pneumatic system. It has also been proposed to employ electrical devices such as relays and solenoids. Although devices of the foregoing variety are acceptable for many applications, they are bulky, expensive, relatively unreliable, relatively slow acting and require substantial amounts of power. As a consequence they are not entirely suitable for some types of applications.

More recently it has been proposed to utilize a lightweight, fast acting, release of the type disclosed and claimed in Patent No. 3,163,732, entitled, Quick Release Mechanism, filed in the name of John Abbott and John J. Phillips and assigned of record to the assignee of this application. In such a quick release mechanism a small member such as a wire is mechanically loaded in tension to a point somewhat less than its yield load at ambient temperatures. To release the mechanism the wire is heated by an electrical current. As the temperature of the wire rises its tensile strength decreases and at some point the tensile strength of the wire falls below the tension actually present in the wire. At this point the wire mechanically breaks from its tensile loading and the mechanical force is released.

The present invention provides a mechanical actuator package that is an improvement over the foregoing quick release mechanism. More particularly this invention provides an actuator package that is not only simpler and cheaper to assemble but is also smaller in size, faster and more reliable in its operation.

In the embodiments of the invention disclosed herein this is accomplished by providing a plurality of members that may be positioned together to form a housing. A small wire is wrapped around these members for retaining them securely fastened together. A linkage is anchored to the housing and coupled to the load to be restrained. When it is desired to release the load an electrical current is passed through the wire whereby the members forming the housing are released and the linkage freed. Because of the novel design and arrangement of the parts the assembly of the package, including the housing and wire release, is greatly simplified and better suited to mass production. Also the operation of the package is more reliable.

These and other features and advantages of the present invention will become readily apparent from the following detailed description of a limited number of embodiments thereof, particularly when taken in connection with the accompanying drawings, wherein like reference numerals refer to like parts and wherein:

FIGURE 1 is a cross sectional view of a mechanical actuator package embodying one form of the invention, said view being taken substantially along the plane of line 1—1 in FIGURE 2, FIGURE 2 is a plan view of the package of FIGURE 1, with a cover removed to more clearly expose its contents.

FIGURE 3 is a perspective view of one part of the actuator package,

FIGURE 4 is a view, on a greatly enlarged scale, of another part of the device of FIGURE 1, FIGURE 5 is a cross sectional view of a mechanical actuator package utilizing another embodiment of the present invention.

Referring to the drawings in more detail, and particularly to FIGURES 1 to 4, the present invention is particularly adapted to be embodied in a mechanical actuator package 10 for restraining a load or force and then quickly releasing it in response to an electrical current. The load or force to be restrained by the package 10 may be of any desired nature. For example the load may be a compressed spring, means for actuating a device such as a valve, a switch, separating a pair of mating electrical connectors, means for releasably securing one or more members in position etc. When the package 10 is actuated by circulating a current therethrough the load is instantly released whereby the desired function is accomplished.

The package 10 is particularly adapted to be mounted on a support member 12 for being retained in position. This member 12 normally forms a part of the load structure or the structure to which the load is anchored. In the present instance the load is retained in position by means of a relatively flexible band 14. When the load is fully restrained the band 14 will be retained in the locked position shown in FIGURES 1 and 2 by a keeper 16. When the load is to be released the package 10 is actuated whereby the keeper 16 and the band 14 are free to move upwardly from the locked position.

The package 10 includes a casing 18 which is adapted to fit onto the side of the support member 12. Fastening means such as a bolt 20 extends through the casing 18 and into the support member 12. The casing 18 includes a recess in one side. This recess may be closed by means of a removable cover 22 to form a chamber 24. A removable partition 26 may be provided to separate the chamber 24 from the clearance space 28 for the head of the bolt 20.

The package 10 includes an electrical conduit 30 that extends from the casing 18 along the bottom side of the support member 12. A pair of electrical wires 32 are disposed inside of the conduit 30. These wires 32 are coupled to a power source 34 such as a battery by means of a normally open control switch 36. Closing of this switch 36 is effective to actuate the package 10 and release the load.

The operative parts of the package 10 include a housing 38 that is mounted inside of the chamber 24. This housing 38 includes a pair of substantially identical members 40 such as shown in FIGURE 3. Each member 40 is semi-cylindrical having a flat face 42. When the two members 40 are joined together these faces 42 mate with each other and a cylindrical structure is formed.

Each member 40 includes a recess 44 extending along the face 42 to form an axial passage 46 through the fully assembled housing 38. Both ends of the members 40 are relieved to provide conical or tapered surfaces 48 and 50 at the entrance at the opposite ends of the passage 46.

A shaft 52 is slidably disposed in the housing 38. The shank 54 of the shaft 52 is a sufficiently snug fit in the passage 46 to maintain it axially aligned without materially interfering with the movement of the shaft 52. One end of the shaft 52 has an enlarged head 56 with a tapered shoulder 58 thereon. This shoulder 58 is adapted to fit into the tapered entrance into the passage 46.

The opposite end of the shaft 52 extends beyond the end of the housing 38 and through a bushing 60. The exposed end of the shaft 52 is threaded into the keeper 16.

The bushing 60 includes a barrel 62 that extends through the end wall 68 of the casing 18. The bushing 60 also includes an enlarged head 70 that forms a radial shoulder 72 and a conical surface 74. The shoulder 72 engages the end wall 68 and retains it in position.

The conical surface 74 is adapted to mate with the conical entrance 50 into the passage 46. When the keeper 16 is threaded onto the end of the shaft 52 it engages the end of the bushing 60 whereby the conical surfaces 74 and 58 on the bushing 60 and the head 56 are forced against the tapered entrances 48 and 50 to the passage 46. If there is any axial force on the mating conical surface it will be effective to produce a radial force on the housing 38 whereby the two half members 40 will tend to expand away from each other. If the two halves 40 actually separate the enlarged head 56 will no longer be retained by the housing 38 and the shaft 52 will be free to slide against the bushing 60.

In order to prevent the radial expansion or separation of the two members 40, a suitable releasable retainer is provided. In the present instance, this retainer includes a wire 76 wrapped around the exterior of the housing 38. To facilitate the wrapping of the wire 76 and to retain it in position each of the members 40 may be provided with a series of helical grooves 78. When the two members 40 are mated to form the housing 38 a single continuous spiral path will be formed around the housing 38. Each of the members 40 may include a shoulder 80 having one or more recessed passages therein. When the wire 76 is wrapped into the recess groove 78, the opposite ends thereof may be wrapped around the shoulders 80 whereby the wire 76 will be securely locked in position. The ends of the wire 76 are electrically connected to the wires 32 leading to the power supply 34.

The present wire 76 is an electrically conductive member. It may consist of a highly conductive material such as copper. However, for reasons that will become apparent it has been found desirable for the wire 76 to consist of a resilient material. Accordingly the wire 76 normally is of a spring steel that tends to unwind into a substantially straight position similar to that in FIGURE 4.

In order to facilitate the design and construction of the package 10 and to assure uniformity in the release of the wire 76, it has been found desirable for the wire 76 to include a necked down portion 82 of relatively small diameter. The electrical resistance of this smaller diameter is considerably greater than that of the larger diameter. As a consequence when a current circulates through the wire 76 the smaller diameter portion 82 will heat up faster than the rest of the wire 76. Moreover the tensile strength of the smaller diameter portion 82 will be substantially less than that of the rest of the wire 76. Accordingly if the wire 76 breaks from tension it will predictably break at this reduced diameter 82.

In addition, each of the members 40 may include a recess 84 that communicates with the groove 78 adjacent its center. When the members 40 are assembled to form the housing 38 these recesses 84 mate and form a radial passage. When the wire 76 is wrapped around the housing 38 the necked down portion 82 is positioned across the passage. The necked down portion 82 is accordingly disposed in air and thermally separated from the housing 38. Thus when this portion 82 heats up very little, if any, heat is transferred into the housing 38 thereby further insuring portion 82 of the wire 76 heating most rapidly.

In order to assemble the package 10 the two members 40 are mated together with the grooves 78 registering. The wire 76 may then be positioned with the reduced center aligned with the recesses 84 and spirally wrapped around the housing. The opposite ends of the wound wire 76 is then locked onto the shoulders 80.

At this point the housing 38 forms a single rigid structure that can be easily handled as a separate item. Following this the shaft 52 may be inserted through the passages in the housing 38 and bushing 60. Next the bushing 60 is inserted through the end wall 68 and keeper 16 threaded onto the end of the shaft 52. By tightening keeper 16 the conical surfaces on the head and bushing 60 are forced against the conical surfaces on the housing 38. Normally the keeper 16 is tightened enough to insure the housing 38 being expanded radially outwardly against the retaining wire 76 whereby a tension is produced in the wire 76.

The keeper 16 may then be coupled to the load by attaching the band 14 to the keeper 16. The axial pull of the load on the shaft 52 further increases the force tending to spread the members 40. As a consequence a substantial amount of tension is present in the wire 76. However, this tension is less than the yield load of the wire 76 at ambient temperatures. Accordingly this is a static condition that can be maintained indefinitely.

In the event it is desired to release the load, the switch 36 may be closed whereby an electrical current circulates through the wire 76. The current will rapidly heat the wire 76 and particularly the reduced center portion 82. As the temperature rises the tensile strength decreases. At some point considerably below the melting point the strength rapidly decreases with small temperature increases and actually becomes less than the tension present in the wire 76. At this point the wire 76 will mechanically fail or break. As soon as the wire breaks the two halves unwind from the housing 38. If the wire 76 is resilient, i.e. a straight spring, it will unwind very rapidly. It should be noted once the wire 76 has broken no additional current will flow even if the switch 36 remains closed. A flange 86 may be provided to prevent the separated wires 76 from shorting out.

As soon as the separated wires 76 unwind from the housing 38 the two members 40 will separate whereby the shaft 52 may move axially through the bushing 60. This will be effective to release the keeper 16 whereby the desired function will be performed.

As an alternative, the embodiment of FIGURE 5 may be employed. This electromechanical actuator package 90 is very similar to the first package 10 however it is particularly adapted for retaining a plurality of members secured together. By way of example, the members may be a bundle of pipes, poles, etc., that are to be quickly released. Also, one of the members may be a container such as a fuel tank that is to be dropped.

This package 90 includes a pair of keepers 92 and 94 adapted to be connected to the opposite ends of a so-called Marmon clamp 96. Such a clamp normally employs a single flexible band or strap extending around the members 98 and 100 which are to be fastened. The adjacent ends of the strap are folded over so as to form a pair of eyes or closed loops 102 and 104 that encompass the keepers 92 and 94. The keepers 92 and 94 fit onto the threaded ends of a pair of bolts 106 and 108 that extend from the opposite ends of the package 90. Nuts 110 and 112 are threaded onto these ends so as to engage the clamp 96. By tightening one or both of these nuts 110 and 112 the two closed ends of the band are drawn together. This will produce tension in the bolts 106 and 108 and will also draw the two members 98 and 100 securely together.

The package 90 includes a housing 114 for securing the heads 116 and 118 of the bolts 106 and 108 together whereby they may withstand the tension. The housing 114 may be generally similar to the preceding housing 38. However, instead of being in two parts it has been found desirable to employ a larger number, for example, four members.

These members may be substantially identical to each other and in the form of a quadrant. When they are compressed radially inwardly they form a single rigid housing 114. However, if they are released they quickly separate whereby the housing 114 will fall apart. When the members are fully assembled they form a passage 120 that extends axially through the housing 114. The ends of the passage 120 are substantially cylindrical and a close fit around the shanks of the bolts 106 and 108.

The center of the passage 120 is enlarged whereby a pair of conical shoulders 122 and 124 are provided. The heads 116 and 118 of the bolts 106 and 108 just fit into the enlarged center and also form conical shoulders 126 and 128 tapered complementary to the shoulders 122 and 124. If desired, a small spring 130 may be fitted between the two heads 116 and 118 to bias the bolts 106 and 108 in axially opposite directions with the heads 116 and 118 maintained against the shoulders 122 and 124.

When fully assembled the housing 114 includes a groove 132 that extends spirally around the exterior thereof. A retainer such as a wire 134 is wound into this groove 132 to keep all of the parts of the housing 114 clamped radially inwardly. The wire 134 may be substantially identical to the conductive wire 76 in the first embodiment 10.

In order to use this package 90 for retaining two structures 98 and 100 in position, the housing 114 is assembled around the heads 116 and 118 of the bolts 106 and 108 and the wire 134 wrapped therearound. The two structures 98 and 100 are then placed in position and the Marmon clamp 96 applied thereto. The fully assembled package 90 is then inserted between the opposite ends of the Marmon clamp 96 applied thereto. The fully assembled package 90 is then inserted between the opposite ends of the Marmon clamp and the two nuts 110 and 112 tightened. This will draw the members 98 and 100 together and produce a large amount of tension in the bolts 106 and 108. Because of the tapered surfaces a large radial force is produced on the housing members. This in turn produces a tension in the wire 134.

When it is desired to release the structures a surge of current circulates through the wire 134. As soon as the wire 134 is heated it will break because of the tension and release the members in the housing 114. The Marmon clamp 96 will immediately come apart and allow the structures 98 and 100 to separate.

While only a limited number of embodiments have been disclosed herein it will be readily apparent to persons skilled in the art that numerous changes may be made thereto without departing from the spirit of the invention. For example, the particular configuration of the package and its parts may be varied. Also the manner in which the package is coupled to the load and the nature of the load may be modified to fit any particular application. Accordingly, the foregoing disclosure and description thereof are for illustrative purposes only and do not in any way limit the invention which is defined only by the claims which follow.

I claim:
1. An electromechanical actuator package for releasably retaining a load, said package including the combination of,
   a pair of substantially identical mating members secured together to form a housing, each of said members including recesses that register with each other to form a passage that extends axially through the housing and has at least one tapered surface thereon,
   an electrically conductive element wrapped around the housing and effective to maintain said members secured together,
   a shaft slideably disposed in said passage, said shaft including at least one tapered surface that mates with the first tapered surface,
   means for coupling the shaft to the load whereby a force is produced between the mating tapered surfaces that tends to separate the housing members and produces a tension in said electrically conductive element, and
   means for circulating an electric current through the element whereby it is heated to a temperature at which its tensile strength is less than the tension therein.
2. The package of claim 1 wherein
   said electrically conductive element is a wire including a spring material, and
   said current means is effective to reduce the strength of said wire whereby it breaks and the spring material causes the wire to unwrap from the housing.
3. The package of claim 1 wherein
   said element is an electrically conductive wire having a portion near its middle with a diameter that is reduced from the diameter of the rest of the wire.
4. The package of claim 1 wherein
   said housing includes a recessed portion and said electrically conductive element is a wire that extends across said recessed portion and is spaced from the housing.
5. The package of claim 1 including
   a recess in the outside of the housing,
   said electrically conductive element is a wire, and
   a portion of reduced diameter near the middle of said wire, said reduced portion extending across said recess whereby the reduced portion is spaced from the housing.
6. The package of claim 1 wherein
   the tapered surfaces on the passage are at the opposite ends thereof, and
   the shaft is moved axially into the housing whereby the housing is axially compressed by the load and radially expanded by the coacting tapered surfaces.
7. The package of claim 1 wherein
   the tapered surfaces on the passage are intermediate and between the ends thereof, and
   the shaft is moved axially outward of the housing whereby the housing is loaded in tension by the load and radially expanded by the coacting tapered surfaces.
8. The package of claim 1 including
   helical grooves on the outsides of said housing members, said grooves being positioned to register with each other whereby a spiral path is formed around the exterior of the housing, and
   the electrically conductive element includes a wire that is disposed in said path and wound spirally around the housing so as to be loaded in tension and compress said members radially inwardly.
9. The package of claim 8 wherein
   said wire includes a portion of reduced diameter that has a greater electrical resistance than the rest of the wire and a small tensile strength than the rest of the wire.
10. The package of claim 8 wherein
    a recess is provided in the exterior of at least one of said housing members in substantial alignment with the spiral path whereby a portion of the wire extends across said recess and is spaced from the exterior of the housing.
11. The package of claim 10 wherein
    the portion of said wire extending across said recess has a diameter that is smaller than the rest of the wire whereby the electrical resistance of the portion is increased and the tensile strength thereof is decreased.
12. An electromechanical actuator package for releasably retaining a load, said package including the combination of
    a plurality of separable members secured together to form a housing,
    a passage extending axially through the housing,
    an electrically conductive element wrapped around the housing and effective to maintain said members secured together,
    a shaft moveably disposed in said passage, said shaft and passage including detent means effective to limit the movement of the shaft through said passage so long as the members in said housing are secured together by the electrically conductive element, and coupling means for coupling the shaft to the load whereby the force of said load and the movement of the shaft is restrained by the detent means, said detent means being effective to force the housing members apart and produce a tension in said electrically conductive element, said tension being less than the tensile strength of the conductive element when the element is at ambient temperatures, said tension being greater than the tensile strength of the element when the element is heated to an elevated temperature by an electric current circulating therethrough.

13. An electromechanical actuator package for releasably retaining a load, said package including the combination of a pair of substantially identical members having faces thereon whereby said faces may be mated to form said members into a housing, a recess in each of said faces extending axially thereof, said recesses being effective to register with each other and form a passage extending axially through the housing, at least one channel on the exterior of each member, said channels being aligned with each other when said members are mated to form a channel extending around the housing, an electrically conductive element disposed in the channel and wrapped around the housing, said element being effective to maintain said members secured together, said element having a large tensile strength when at ambient temperature and a small tensile strength when heated to an elevated temperature by an electric current flowing therethrough, at least one tapered surface on the passage, a shaft slideably disposed in said passage and having a portion thereof engaging the tapered surface in said passage, and means for coupling the shaft to the load whereby the shaft is forced against the tapered surfaces so as to force the housing members apart and produce a tension in said electrically conductive element, said tension being in excess of the large tensile strength and less than the small tensile strength.

References Cited

UNITED STATES PATENTS 3,163,732 12/1964 Abbott et al. _____ 200—116
3,323,814 6/1967 Phillips _____ 287—20
3,359,804 12/1967 Phillips _____ 200—123 XR BERNARD A. GILHEANY, *Primary Examiner.*

H. B. GILSON, *Assistant Examiner.*